(12) United States Patent
Flickinger

(10) Patent No.: US 7,996,337 B2
(45) Date of Patent: *Aug. 9, 2011

(54) METHOD AND SYSTEM FOR REMOTELY DETERMINING THE RELIABILITY OF A DC MOTOR SYSTEM

(75) Inventor: Greg L. Flickinger, Pittsburg, PA (US)

(73) Assignee: General Electric Company, Schenectady, NY (US)

( * ) Notice: Subject to any disclaimer, the term of this patent is extended or adjusted under 35 U.S.C. 154(b) by 824 days.

This patent is subject to a terminal disclaimer.

(21) Appl. No.: 11/872,373

(22) Filed: Oct. 15, 2007

(65) Prior Publication Data

US 2009/0096407 A1 Apr. 16, 2009

(51) Int. Cl.
*G06F 15/18* (2006.01)
*G06G 7/00* (2006.01)
(52) U.S. Cl. .......................................................... 706/7
(58) Field of Classification Search ........................ 706/7
See application file for complete search history.

(56) References Cited

U.S. PATENT DOCUMENTS

| | | | |
|---|---|---|---|
| 7,095,193 B2 * | 8/2006 | Kellogg et al. | 318/400.38 |
| 7,254,514 B2 | 8/2007 | House et al. | |
| 7,323,835 B2 * | 1/2008 | Hazelton et al. | 318/400.38 |
| 7,925,387 B2 * | 4/2011 | Zheng et al. | 700/291 |

* cited by examiner

*Primary Examiner* — Michael B Holmes
(74) *Attorney, Agent, or Firm* — Dale J. Davis; Ernest G. Cusick; Frank A. Landgraff

(57) ABSTRACT

A method and system for remotely predicting the reliability and the remaining time before failure for an DC motor system is provided. The method and system may remotely determine the reliability utilizing a DC motor condition forecaster. The method and system may include acquiring historical motor data, obtaining operational data, performing failure analysis, developing a causal network, and performing an integrated causal network and reliability analysis of the DC motor system. The method and system may provide at least one notification of an issue with the DC motor system or at least one component of the DC motor system.

20 Claims, 5 Drawing Sheets

METHOD AND SYSTEM FOR REMOTELY DETERMINING THE RELIABILITY OF A DC MOTOR SYSTEM

BACKGROUND OF THE INVENTION

This application is related to commonly-assigned U.S. patent application Ser. No. 11/872,366, filed Oct. 15, 2007; and U.S. patent application Ser. No. 11/872,211, filed Oct. 15, 2007.

The present invention relates to the reliability of a DC motor system, and more particularly to a method and system for remotely determining, with an ascertained statistical confidence, the reliability of a component with the DC motor system.

Some operators of DC motor systems may employ a remote monitoring and diagnostics (RM&D) system, or the like, in determining the reliability of the system. Currently known RM&D systems tend to focus on the collection for trending purposes.

The present invention relates to the operation of a DC motor system, and more particularly to a method and system for determining, with an ascertained statistical confidence, the reliability of a component with the DC motor system.

Acquisition of accurate information concerning the running condition, status, and performance of DC motor systems, such as, but not limiting of, electric motors used in industrial manufacturing processes, power generation systems, or the like; is often crucial in maintaining successful operation of such systems. Consequently, considerable efforts are often expended to develop and improve upon existing methods and systems used for assessing the operation and performance of electric motors and coil devices in such systems. Robust methods of inspection are often desired for such critical process motors, since inoperability of a motor may adversely impact revenue generation.

Robust processes for the inspection and predictive maintenance of DC motor systems usually involve monitoring a variety of operational indicators to detect an impending failure and may also be used for determining reliability. Conventionally, one or more indicators are monitored over time and used to trigger a maintenance outage/recommendation when the value of a monitored parameter exceeds a predetermined threshold. The contemporary technological trend is to automate the inspection process by affixing a variety of sensors and transducers to the DC motor to continuously collect information through either off-line monitoring or on-line monitoring techniques. Operational indicators for an operating DC motor may then be tracked continuously and an alarm may be immediately triggered if a predetermined threshold value for a particular indicator is exceeded. For example, but not limiting of, vibration amplitude or spectral data that exceeds or drifts from a predetermined range or value can be used to activate an alarm to notify the equipment operator that a particular type of failure mode is imminent.

The use of motor operational indicator data as a failure predictive tool and to assess motor health has been explored to some extent in the past by various investigators. Different DC motor system indicators may be used for this purpose and may include at least one device integrated with the DC motor for detecting issues with the commutator, arcing, and/or sparking issues, etc.

In general, service and repair information acquired as a result of previous inspections and routine maintenance of motor equipment is not compiled for the purpose of performing predictive/prognostic maintenance or conducting a comprehensive analysis of motor health. Conventionally, a DC motor system expert/specialist simply assesses available historical information and then formulates a maintenance recommendation based on obvious trends and personal experience. A decision to repair or perform maintenance is commonly based on an estimate of the reliability developed primarily from the subjective judgment of the expert. In other instances, preventive maintenance is based solely on the number of hours of motor operation or the time since the last maintenance outage, rather than on any condition-based test results.

There are a few drawbacks with the currently known methods of remotely monitoring and diagnosing the reliability of the DC motor system. The conventional RM&D systems typically target only data that may represent an imminent failure and do not provide a quantitative determination of remaining motor life or motor reliability. Some conventional systems provide only a general warning of imminent motor failure based on the detection of an alarm condition from a single monitored indicator. These systems may not provide an assessment of motor reliability, nor do they provide an estimate of the operating time remaining until a component of the DC motor system may fail.

For the foregoing reasons, there is a need for a method and system for remotely determining the reliability of the DC motor system. The method and system should receive a plurality of operating data on the components of the DC motor system. The method and system should also analyze motor data and determine the motor reliability and estimated the operating time until a failure of a component of the DC motor system.

BRIEF DESCRIPTION OF THE INVENTION

In accordance with an embodiment of the present invention, a method of remotely determining reliability for at least one DC motor system located on a site, the method comprising: providing at least one remote monitoring and diagnostics (RM&D) system, wherein the at least one RM&D system is at a location different from the site having the at least one DC motor system; integrating the at least one RM&D system with at least one DC motor condition forecaster, wherein the at least one DC motor system condition forecaster receives a plurality of operating data from the at least one DC motor system; receiving the plurality of operating data from the at least one DC motor condition forecaster; transmitting a plurality of historical operating data corresponding to the at least one DC motor system from at least one historical database to the at least one RM&D system; utilizing the plurality of operating data to determine whether reliability of at least one component of the at least one DC motor system are within an alarm range; and if reliability of the of at least one component of the at least one DC motor system are within the alarm range; then notifying at least one support network.

In accordance with an alternate embodiment of the present invention, a method of remotely determining reliability for at least one DC motor system located on a site, the method comprising: providing at least one remote monitoring and diagnostics (RM&D) system, wherein the at least one RM&D system is at a location different from the site having the at least one DC motor system; integrating the at least one RM&D system with at least one DC motor condition forecaster, wherein the at least one DC motor system condition forecaster receives a plurality of operating data from the at least one DC motor system; wherein the at least one DC condition forecaster comprises the steps of: performing at least one failure analysis based on a composite of reliability probability distributions corresponding to predetermined sub-populations of historical failure causes relating to the at least one DC motor system; developing at least one causal network for modeling reliability of a plurality of DC motor systems, including the at least one DC motor system and assessing the condition of the at least one component of the at least one DC motor system based on the at least one causal network, wherein the casual network utilizes fuzzy logic; and performing at least one integrated causal network and reliability analysis of the at least one DC motor system utilizing a Weibull probability distribution function; wherein results from the at least one analysis are integrated with results from the step of assessing the condition of the at least one component of the at least one DC motor system on the at least one causal network to compute a quantitative value for a time remaining before the failure of the at least one component of the at least one DC motor system; receiving the plurality of operating data from the at least one DC motor condition forecaster; transmitting a plurality of historical operating data corresponding to the at least one DC motor system from at least one historical database to the at least one RM&D system; utilizing the plurality of operating data to determine whether reliability of at least one component of the at least one DC motor system are within an alarm range; and if reliability of the of at least one component of the at least one DC motor system are within the alarm range; then notifying at least one support network.

In accordance with another alternate embodiment of the present invention, a system for remotely determining reliability for at least one DC motor system located on a site, the system comprising: at least one remote monitoring and diagnostics (RM&D) system, wherein the at least one RM&D system is located at a site different from the site having the at least one DC motor system; wherein the at least one RM&D system monitors a plurality of operating data of the at least one DC motor system; at least one DC motor condition forecaster, wherein the at least one DC motor condition forecaster: performs at least one failure analysis based on a composite of reliability probability distributions corresponding to predetermined sub-populations of historical failure causes relating to the at least one DC motor system; develops at least one causal network for modeling reliability of a plurality of DC motor systems, including the at least one DC motor system and assessing the condition of the at least one component of the at least one DC motor system based on the at least one causal network, wherein the casual network utilizes fuzzy logic; and performs at least one integrated causal network and reliability analysis of the at least one DC motor system utilizing a Weibull probability distribution function; wherein results from the at least one analysis are integrated with results from the step of assessing the condition of the at least one component of the at least one DC motor system on the at least one causal network to compute a quantitative value for a time remaining before the failure of the at least one component of the at least one DC motor system; means for integrating the at least one RM&D system with the at least one DC motor condition forecaster; means for transmitting the plurality of operating data from the DC motor condition forecaster to the at least one RM&D system; means for receiving a plurality of historical operating data corresponding to the at least one DC motor system from at least one historical database; means for utilizing the plurality of operating data to determine whether reliability and a remaining time before a failure of the at least one component of the at least one DC motor system are within an alarm range; and means for determining if reliability and the remaining time before failure of at least one component of the at least one DC motor system are within the alarm range; and for notifying at least one support network.

DETAILED DESCRIPTION OF THE INVENTION

Figure 1:
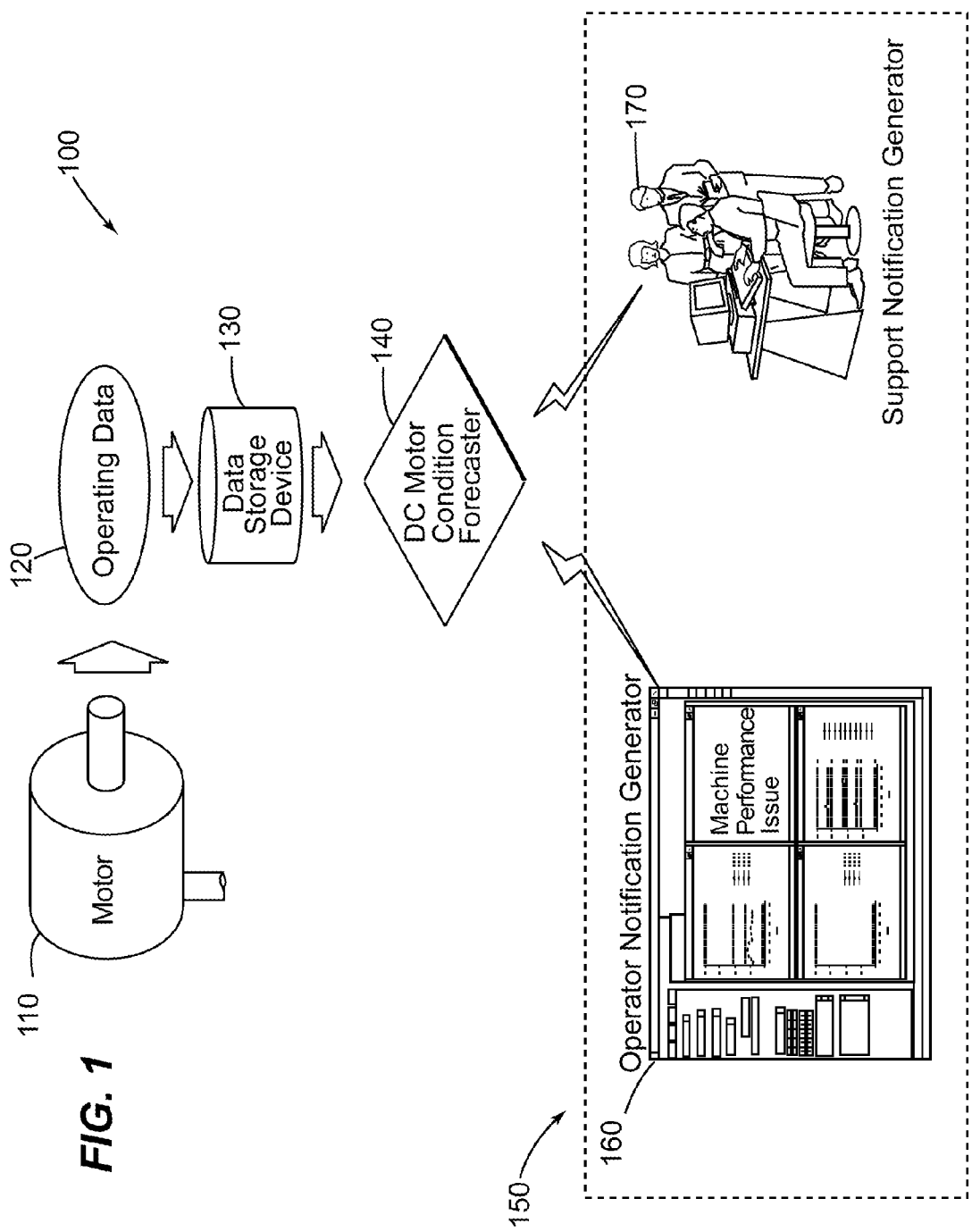
FIG. 1 is a schematic illustrating the environment in which an embodiment of the present invention operates.

The following detailed description of preferred embodiments refers to the accompanying drawings, which illustrate specific embodiments of the invention. Other embodiments having different structures and operations do not depart from the scope of the present invention.

An embodiment of the present invention takes the form of an application and process that may determine the remaining life of at least one DC motor system from a remote location. The present invention can be applied to DC motor systems used in a variety of applications, including: industrial processes, powerplant processes; and combinations thereof.

A DC motor system may include at least one DC motor and at least one of the following components: sensors, transmitters, temperature elements, or the like, and combinations thereof which may monitor the DC motor. For example, but not limiting of, the DC motor system may include at least one sensor for detecting at least one of the following problems generally specific to a DC motor system: commutator issues, arcing, sparking, and combinations thereof.

A remote monitoring and diagnostics (RM&D) system may be located on a site different from the location of the at least one DC motor system. The RM&D system may include a plurality of transmitters and receivers that are either wireless connected to and/or wired to the site operating the DC motor system; and receive operating data from that site. Typically the RM&D system includes a plurality of computer systems, servers, and software tools. A team who may operate the RM&D system may employ the software tools to remotely determine an operating status of at least one component of the at least one DC motor system.

The software tools of the RM&D system may for example, but not limiting of, perform the following tasks. Remote Monitoring—which may involve monitoring of operational data using automated and manual techniques, allows the team to support site operational activities. Decision Support— which may assistance an operator of the DC motor system in understanding the operation, process deviations, and unforeseen operational event situations that may occur. The decision support many also provide recommended trouble-shooting steps. Operational Data Archive and Retrieval—store operational data that may be retrieved. Operational data may be used to provide operational records for unit operational comparisons, detection of developing technical issues, and assist in determining the root cause of unforeseen operational events. Reporting—operational assessment reports may be generated to provide a record of key operating parameters and significant operational events, trends and anomalies. This data is summarized to assist with the identification of performance shortfalls and the planning of maintenance activities.

The RM&D system may receive data (hereinafter operating data) corresponding to the at least one DC motor system. A DC motor system may have a plurality of operational indicators corresponding to the sensor, transmitter, temperature element, or the like, which may be part of the DC motor system, as described. The operational indicators may be used for determining the reliability of the DC motor. The operational indicators may include, for example, but not limiting of, data representing: an armature current; a field current; a field temperature; a bearing temperature; or vibration; and combinations thereof. For example, but not limiting of, the name of the operational indicator representing a vibration level on the DC motor may be "Vib_1". The corresponding operating data may provide values for Vib_1 over a specified range of time, which may be received by the at least one DC condition forecaster.

Referring now to the Figures, where the various numbers represent like elements throughout the several views, FIG. 1 is a schematic illustrating the environment in which an embodiment of the present invention operates. FIG. 1 illustrates a site 100 comprising a DC motor system 110; a plurality of operating data 120; a data storage device 130; a DC motor condition forecaster 140; and a RM&D system 150 comprising an operator notification generator 160, and a support notification generator 170.

The site 100 may comprise at least one control system or the like (not illustrated) which may receive the plurality of operating data 120 from the DC motor system 110. The plurality of operating data 120 may comprise operational indicators corresponding to the thermal, chemical, mechanical, and electrical operating data; and may be used in evaluating the reliability of the DC motor system 110.

The plurality of operating data 120 may be transmitted to at least one data storage device 130, which may, inter alia, collect, process, and store, the plurality of operating data 120. The data storage device 130 may be approximately located at the site 100.

In an embodiment of the present invention, a data storage device 130 may transmit the plurality of operating data 120 to at least one DC motor condition forecaster 140, which may be approximately located at the power plant site 100.

The DC motor condition forecaster 140 may predict the reliability and estimate a time to failure of at least one component of the DC motor system 110. The DC motor condition forecaster 140 may be integrated with at least one RM&D system 150.

The RM&D system 150 may, be provided with and/or include a plurality of rules, or the like. The plurality of rules may detect, the likelihood of a failure of a component on the DC motor system 110, for example, but not limiting of, in real time.

The RM&D system 150 may depending on the nature and severity of a detected issue, transmit the details of a determined issue to at least one operator notification generator 160 and/or at least one support notification generator 170.

The operator notification generator 160 may automatically provide the operator of the DC motor system 110 with a notification of the issue. In an embodiment of the present invention, the notification may provide at least one recommendation for resolving the issue.

The support notification generator 170 may automatically provide a third-party support system with the details of the discovered issue. Here, for example, but not limiting of, the third-party support system may be contacted if the RM&D system 150 determines that the issue requires the involvement of an expert.

Before continuing the discussion on an embodiment of the RM&D system 150 of the present invention, further discussion on an embodiment of the DC motor condition forecaster 140 is provided next.

Industrial and power generation motors are often supplied and installed with operational indicators to indicate running conditions for the purpose of trending operational indictor data and planning maintenance procedures. Operational indicators may be configured to provide online and/or offline testing of an electric motor. Online testing has advantages over offline testing due to an ease of data acquisition and an ability to avoid downtime of the electric motor. Operational indicators used for online testing are configured to acquire operational indicators of the DC motor 110. The operational indicators may include, for example, but not limiting of, voltage, current, phase, frequency, total vibration amplitude, torque, and slip.

A method has been designed for forecasting the reliability, including a failure mode, of the DC motor system 110, based on sensor inputs including the operational indicators. The method may incorporate a large database of inspection information and industry standard data utilized for a probabilistic analysis of the sensor inputs and a causal network, which may incorporate, for example, but not limiting of, fuzzy logic, employed to relate various inputs with potential results.

Engineering systems analysis has been successfully applied to reliability calculations in related fields such as electronic devices. Mean-time-to-Failure (MTTF) data are collected on various components of a system. A designer then calculates system reliability based upon reliability block diagrams and produces an overall system reliability distribution, R. The dependence of R is a function of individual indicators of the system, λ, as described below:

$$R = f(\lambda_1, \lambda_2, \ldots \lambda_n)$$

Each of the individual indicators λ, describes a failure rate of a corresponding component of the system. Each component of the system experiences a useful fife that may be assessed and used in determining the reliability of the at least one DC motor system 110.

If failure rates of multiple components are independent, then a multiplicative relationship can be used to calculate system reliability:

$$p(\lambda) = \prod_{i=1}^{k} f(\lambda_i)$$

Otherwise a simulation of a joint, dependent probability density function (pdf) is required. The method is to randomly sample a joint pdf, compute a reliability for that run and then construct an overall reliability distribution function based on an accumulation of runs. Component life is distributed according to a probability density function and may take the form of an exponential, log-normal or Weibull distribution. The Weibull distribution is most useful due to its flexible shape of the distribution with shape and scale parameters, β and, η where (t) is a time range:

$$f(t) = \frac{\beta}{\eta}\left(\frac{t}{\eta}\right)^{\beta-1} e^{-\left(\frac{t}{\eta}\right)^{\beta}}$$

Data for the individual Weibull distributions described by the shape and scale parameters, β and, η can be extracted from a database compiled from cataloged root cause failures for a variety of components. The indicators can be used to accelerate the scale, $\eta_f$, of the Weibull distribution through influence relationship such as an Arrhenius equation. An acceleration factor (Af) using the Arrhenius equation may be given by:

$$Af = \exp(\text{act}E/V_n - \text{act}E/V_a).$$

Here the activation energy (actE) may be set to 0.1, $V_n$ may be a constant set to 1, and $$V_a = 1/E[\text{indicators}]$$

Where a function E is used to aggregate the number and duration of the indicators over time. In an embodiment of the present invention, a regression may be performed over the prior history of the data. However other methods such as, but not limiting of, a fading model that reduces the effect of the indicators over time when not present. The activation energy and $V_n$ constants may be re-calibrated when there is sufficient failure data to do so. When there is no data to predict a failure then the acceleration factor (Af) may be set to 1. The acceleration factor reduces the scale parameter in the life calculation to:

$$\eta_f = \eta/Af$$

This method, because or the simplicity, may be used to accelerate the life calculation. However, other methods may be used to accelerate the life calculation equation.

Conditional probabilities, f(A(t)|B(t)) of motor reliability are determined through a collection of field data of the system. In general, a conditional probability refers to the probability of event B happening, given that event A has already occurred. The collection of field data is accomplished, for example, but not limiting of, using either online or offline methods of data collection. The conditional probabilities may be used when constructing the causal network assessment (fuzzy model for example, but not limiting thereof).

As will be appreciated, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit", "module," or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++, or the like. However, the computer program code for carrying out operations of the present invention may also be written in conventional procedural programming languages, such as the "C" programming language, or a similar language. The program code may execute entirely on the user's computer, partly on the user's computer, as a stand-alone software package, partly on the user's computer and partly on a computer or entirely on the computer. In the latter scenario, the computer may be connected to the user's computer through a local area network (LAN) or a wide area network (WAN), or the connection may be made to an external computer (for example, but not limiting of, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a public purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
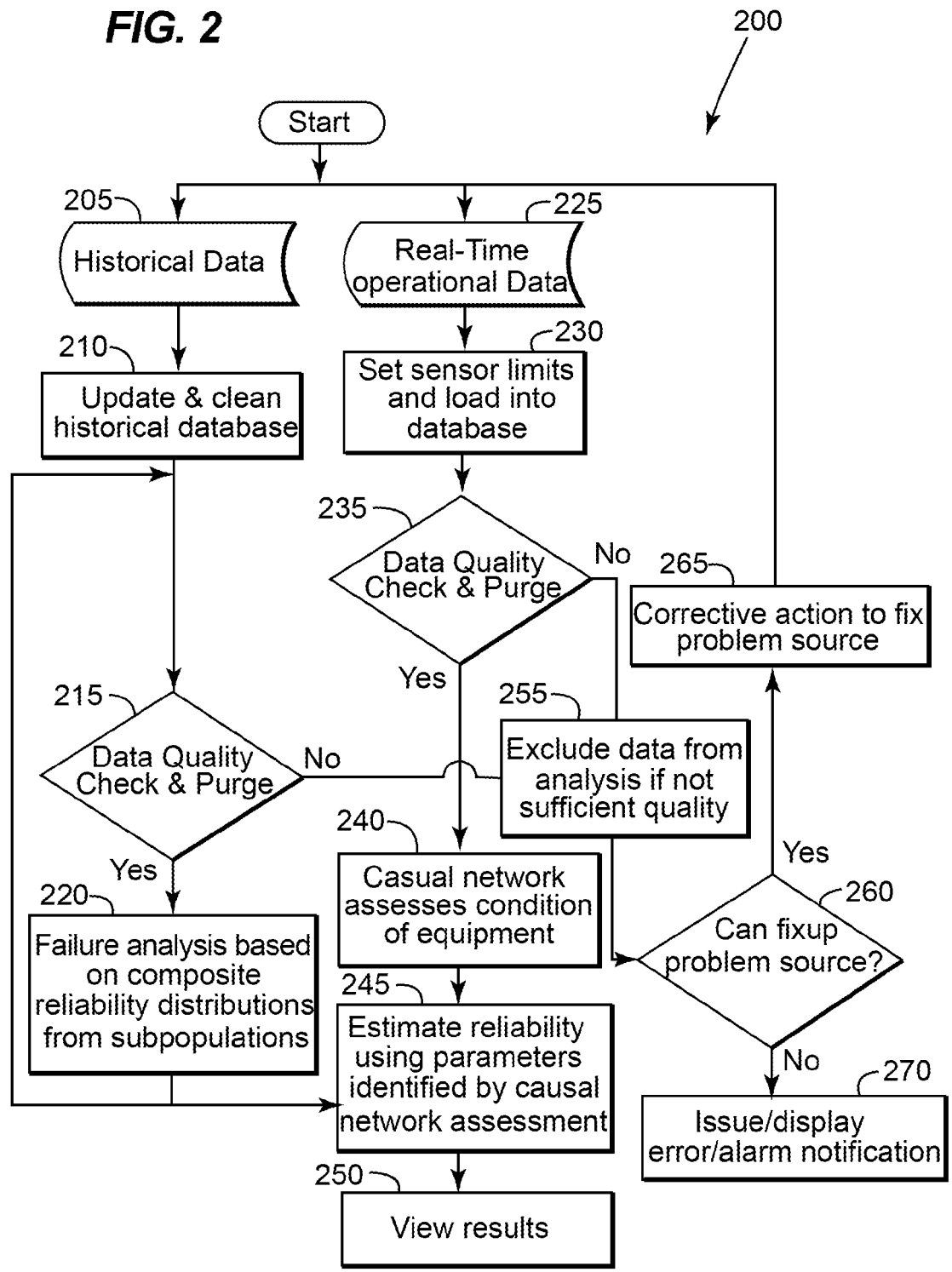
FIG. 2 is a high-level flow diagram illustrating a method utilized by a DC condition forecaster in accordance with an embodiment of the present invention.

FIG. 2 is a high-level flow diagram illustrating a method 200 utilized a DC motor condition forecaster 140 in accordance with an embodiment of the present invention.

The method 200 initially involves receiving and organizing historical motor repair data into a database in step 205. The historical motor repair data acquired in step 205 corresponds to a same or similar motor systems. In step 210, the database is updated and purged to remove any erroneous or irrelevant data. In step 215, data quality checking and purging is performed.

If the method 200 determines that the data quality is acceptable in step 215, then in step 220 at least one failure analysis for the DC motor system 110 may be performed based on a composite of reliability distributions corresponding to various sub-populations of electrical, mechanical, environmental, and systemic fault issues/failure modes; then the method 200 may proceed to step 245 where an estimate of reliability using indicators identified by causal network assessment may be performed, as discussed below. The various sub-populations may include for example, but not limiting of data representing an armature current; a field current; a field temperature; a bearing temperature; vibration; and combinations thereof; relating to the type DC motor system 110.

The method 200 may proceed to step 255 if the data quality checking and purging performed in step 215 has discovered errors. In step 255 any data that does not meet a predetermined quality criterion may be excluded from use in the current analysis.

The method 200, in step 260, may determine if the problem source of the excluded data can be fixed. If the problem source of the excluded data may be fixed, then the method 200 may proceed to step 265; otherwise the method 200 may proceed to step 270. In step 265, the method 200 may perform at least one corrective action to fix the problem source of the excluded data. In step 270, the method 200, may provided a notification, or the like, of the issue or error with the excluded data to the user.

The method 200 may also execute a series of concurrent steps (225-240), while executing steps 205-220. In step 225, the method 200 may monitor and acquire the current operational data 120, in real-time, from the operational indicators of the DC motor system 110 for which a reliability and time-to-failure assessment may be desired. The current operational indicator data 120 may also be compiled in another database in step 225 (or integrated into the historical database) and continually updated.

In step 230, the method 200 may set load into the database sensor limits. Specific data ranges and limits or calculated metrics for the particular DC motor system 110 operational indicators may also be set and monitored in the database and used, for example, but not limiting of, to trigger a notification/alarm condition when appropriate in step 230.

The method 200 may also perform data quality checks and purging in step 235, similar to step 215. If step 235 determines that the data meets a predetermined quality criterion, then the method 200 may proceed to step 240; otherwise the method 200 may proceed to step 255, as discussed and whereby after step 255 is performed the method 200 may then revert to step 225.

In step 240, the method 200 may provide at least one casual network, which may assess the condition of the components of the DC motor system 110. The causal network may develop at least one condition used for developing failure modes. The causal network may utilize fuzzy logic for assessing the condition of the components of the DC motor system 110.

In step 245, the method 200 may estimate reliability using indicators identified by the causal network assessment of step 240. Here, the method 200 may integrate/combine the results of reliability analysis from the historical data, correlate the results from the casual network assessment of step 240, and then develop a statistically reliable prediction of an estimated time remaining before failure. Step 245 may perform a method similar to the aforementioned: integrating data from step 220 instead of step 240.

In an embodiment of the present invention, implementation of the method 200 may include computing the Maximum Likelihood Estimate (MLE) of Weibull reliability indicators for the DC motor system 110 and/or the equipment components identified by the causal network.

In step 250, the method 200 may allow a user to view results of the analysis discussed above. Computed statistical estimations of system reliability and an estimated time remaining before failure may be displayed using conventional computer I/O interface/display devices. In an embodiment of the present invention, the estimated time remaining before failure and computed reliability are displayed using dynamic graphical images such as, but not limited to, a moving bar graphs and changing data odometers, or the like. In an embodiment of the present invention, the method 200, in step 250, may generate an operability curve (not illustrated), or the like, which a user may view on the workstation 150. The operability curve may provide a user with guidance on how to safely operate the DC motor system 110.

In general, the various data validation and calibration steps (e.g., 215 and 235) may be avoided however, use of such may improve both the failure analysis, and the causal networks relied upon for developing statistical predictions of reliability.

Figure 3:
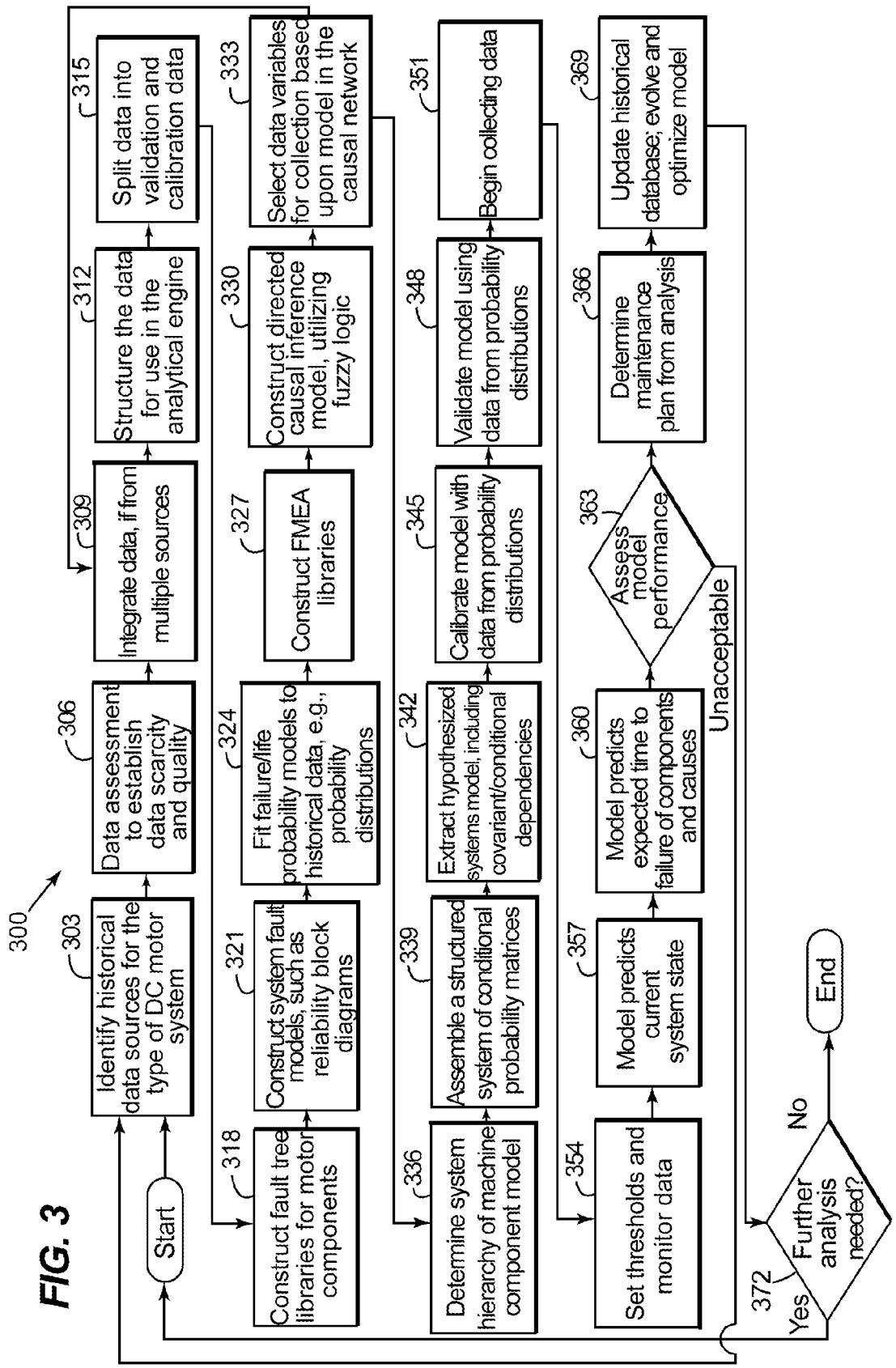
FIG. 3 is a detailed flow diagram illustrating the method of FIG. 2 in accordance with an embodiment of the present invention.

FIG. 3 is a detailed flow diagram illustrating a method 300, similar to the method 200 of FIG. 2 in accordance with an embodiment of the present invention. FIG. 3 provides a detailed procedural flow diagram that illustrates the method 300 for determining DC motor reliability and predicting time-to-next-repair (or failure) that may be used by the DC motor condition forecaster 140.

In step 303, the method 300 may identify historical data sources for the type of DC motor system 110. In step 303, for example, but not limiting of, historical test data, and/or failure analysis records acquired over a period of time, for the DC motor system 110 being evaluated, may be identified and a historical database of part/component failure rate data may be compiled. The historical database may be maintained in the data storage device 130. The historical database may also be updated by at least one manual data transfer means using, for example, but not limiting of, removable storage media (e.g., CD ROM, compact flash, or the like).

The method 300 in steps 306 through 333 may represent general data preprocessing steps performed to structure and combine historical motor data that may be later used for reliability computations. In step 306, the method 300 may perform a data assessment to determine scarcity and quality of the data received in step 303. In step 309, the method 300 may integrate the data if acquired from multiple sources. Next, in step 312, the method 300 may structure the data for use by the analytical engine. Next, in step 315, the method 300 may split data into validation and calibration type data. Next, in step 354, the method 300 may construct system fault tree libraries for the components of the DC motor system 110. Next, in step 321, the method 300 may construct system fault models (such as, but not limiting of, reliability block diagrams). Next, in step 324, the method 300 may fit the failure/life-span probability models to the historical data (e.g., using for example, but not limiting of, a probability distribution, or the like). Next, in step 327, the method 300 may construct a plurality of libraries, such as but not limited to, Failure Modes and Effects Analysis (FMEA) libraries to identify common failure modes. Next, in step 330, the method 300 may construct directed causal inference models, networks or the like; utilizing, for example, but not limiting of, fuzzy logic. The models may be used to compute conditional probability of motor component degradation. Next, in step 333, the method 300 may select data variables for collection based upon model in the causal network.

Steps 336 through 342, of the method 300, illustrate procedural steps for segmenting the DC motor system 110 by component and establishing dependencies within the causal network. For example, but not limiting of, a system hierarchy of a machine component model may be determined in step 336; a structured system of conditional probability matrices may be assembled in step 339; and a hypothesized systems model including covariant/conditional dependencies may be then extracted in step 342.

Next, in steps 345 and 348, the systems model, discussed in steps 336-342, may be properly calibrated with respect to the DC motor system 110 under investigation. For example, but not limiting of, the systems model may be calibrated with data from probability distributions in step 345; and then validated using data from probability distributions in step 348.

In step 351, the method 300 may begin collecting data. Step 351 may represent the initiation of a procedural stage of field data collection from the operational indicators that may be attached to the DC motor system 110 under analysis. At this point, current operational/test data may be obtained on the particular DC motor system 110 under analysis. This field data may be collected from the operational indicators (previously discussed) on the DC motor system 110 or other conventional means at the site 100.

In step 354, the method 300 may set thresholds and monitor data. In step 354, the DC motor system 110 thresholds and alarm limits may be constructed/set-up and the field data from the motor system may be monitored. If the thresholds or alarm limits are exceeded some form of real-time feedback, such as, but not limiting of, an alarm notification may be provided.

In step 357, the method 300 may predict a current "state" of the DC motor system 110. As illustrated in step 357, the state of the DC motor system 110 may be predicted based on the causal network, the thresholds, and the monitor data acquired in step 354.

In step 360, the method 300 may use the system model to predict expected time-to-failure of the various DC motor system 110 components. Step 360 may also determine the cause of the predicted failures. In an embodiment of the present invention, the system model may also predict for example, but not limiting of, covariant/conditional dependencies.

Next, as illustrated in steps 363 and 366, decision points may be reached whereby an operator may need to evaluate: alarm conditions; assess the model's performance; and/or decided on whether repair or replacement of a component is recommend. If an operator determines in step 363 that the assessed performance of the model yields inaccuracies that may are unacceptable, then the method 300 may revert to step 303; otherwise the method 300 may proceed to step 366. In step 366, the method 300 may determine a maintenance plan from the analysis. Here, for example, but not limiting of, an operator may develop the maintenance plan.

Next, steps 369 and 372 may illustrate further steps, which may be taken to improve the predicting capabilities of the causal networks and optimize the reliability model. In step 369, the method 300, may update the historical database with acquired data, evolve, and optimize the model to increase accuracy. In step 372, the method 300 may determine whether further analysis may be required. In step 372, if an operator determines that the system model may be inaccurate or unrealistic, the whole method 300 may be re-initiated. If an operator determines that the method 300 may need to be re-initiated then the method 300 may revert to step 303; otherwise the method 300 has ended.

Figure 4:
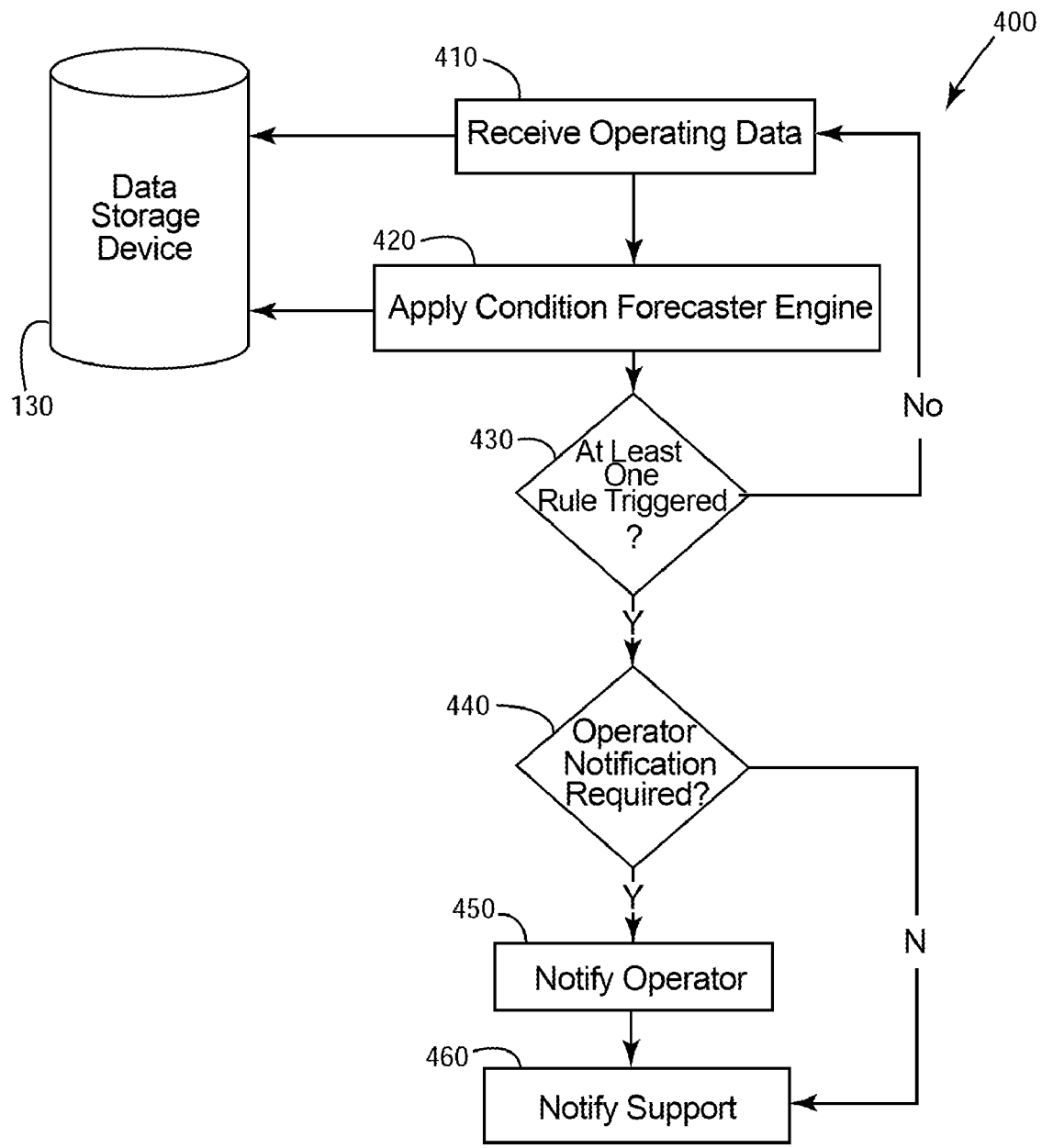
FIG. 4 is a flowchart illustrating an example of a method of utilizing a RM&D system to determine the reliability of a DC motor system in accordance with an embodiment of the present invention.

FIG. 4 is a flowchart illustrating an example of a method 400 of remotely predicting the remaining life of a DC motor system in accordance with an embodiment of the present invention. The method 400 may integrate the RM&D system 150 with the DC motor condition forecaster 140.

In step 410, the method 400 may receive a plurality of operating data 120 from at least one DC motor system 110 (illustrated in FIG. 1). An embodiment of the present invention may allow for receiving the plurality of operating data 120 from multiple DC motor systems 110 located on the site 100. For example, but not limiting of, the method 400, in step 410 may receive the plurality of operating data 120 from a DC motor system 110 coupled to an industrial process; a DC motor system 110 used in a distribution system; and a DC motor system 110 used in an electrical generation system; or combinations thereof.

The plurality of operating data 120 may be received at different sampling rates, or the like, such as, but not limiting of the invention, one data point per second (1/sec) or one data point per thirty seconds (1/30 sec). Generally, during the operation of a DC motor system 110, certain operating data points may be used for monitoring purposes, while other operating data points may be used for controlling or other purposes that require a higher sampling rate. Here, to conserve the storage space, which may be used to store the operating data 120, the operating data, points used for monitoring may be received at a slower sampling rate, such as 1/30 sec. Furthermore, the operating data points used for controlling may be received at a higher sampling rate, such as 1/sec. For example, but not limiting of, an operating data point used for monitoring a vibration level may be received at a slower sampling rate, such as 1/10 sec; and an operating data point used for controlling a stator temperature may be received at a higher sampling rate, such as 1/sec.

The plurality of operating data 120 received in step 410 may be transmitted to at least one data storage device 130. An embodiment of the present invention may allow for a plurality of data storage devices 130. For example, but not limiting of, a separate data storage device 130 may be designated for each DC motor system 110 on the site 100. The data storage device 130 may be approximately located on the site 100.

As discussed, the DC motor system 110 may include at least one control system, or the like, which typically receives the plurality of operating data 120. In step 420, the method 400 may integrate with the DC motor condition forecaster 140 which may apply at least one analysis to the plurality of operating data corresponding to the operational indicators. As discussed, the DC motor condition forecaster 140 may predict, in real-time, the reliability and remaining time before a failure of at least one component of the DC motor system 110. The evaluation may determine whether or not the at least one operational indicator is within a specified range. As discussed, the operational indicators may include for example, but not limiting of: voltage, current, phase, frequency, total vibration amplitude, torque, slip, and other data that may be used to directly or indirectly evaluate the thermal, chemical, mechanical, and electrical characteristics of the DC motor system 110.

In an embodiment of the present invention a user, such as but not limiting of, an operator, a support expert, or the like; may select which of the plurality of operating data 120 may be associated with a operational indicator. For example, but not limiting of, an operator may select the signal name for current (AMP1, or the like) as the operational indicator. Here, the method 400, in step 420 may apply the at least one DC motor condition forecaster 140 to the plurality of operating data 120 corresponding to the AMP1 signal. The method 400, in step 420, may also transmit the plurality of operating data 120 to the at least one data storage device 130.

In step 430, the method 400 may determine whether or not at least one rule of a plurality of rules is met. Each rule of the plurality of rules may be associated with a specific reliability related issue. For example, but not limiting of, a rule may be associated with a AMP1 signal. Here, if the AMP1 signal is not within a specified range, the rule may be met. An embodiment of the present invention may allow for a third-party support expert, or the like, to define or modify each rule of the plurality rules. An alternate embodiment of the present invention may provide for the operator of the DC motor system 110 to define or modify each rule of the plurality rules. An embodiment of the present invention may utilize at least one math engine, or the like, to determine whether the operational indicator may be within the specified range. The math engine may also perform a plurality of statistically tests, including: normality testing; SPC rules or the like; confidence intervals; etc. If the at least one rule was met in step 430, then the method 400, may proceed to step 440, otherwise the method 400 may revert to step 410.

In step 440, the method 400, may determine whether or not at least one operator notification is required. The operator notification may alert the operator of the power plant machine 110 of a potential performance issue. An embodiment of the present invention may allow for the operator of the power plant machine 110 to select which of the plurality of rules, if met, requires an immediate notification. This feature may be very useful when monitoring a specific operational indicator associated to a rule. For example, but not limiting of, if the AMP1 signal is associated with a rule, which is met, the method 400, may automatically generate a notification. If at least one operator notification is required then the method 400, may proceed to step 450, otherwise the method 400 may proceed to step 460.

In step 450, the method 400 may automatically generate an operator notification of a potential reliability issue. The operator notification may inform the operator of the DC motor system power 110 of a plurality of operating conditions related to the potential reliability issue. The operator notification may also provide recommendations for investigating the reliability issue. For example, but not limiting of, an operator notification informing the operator of an issue with the AMP1 signal may provide a recommendation on how to determine whether the issue may be a fault with the AMP1 signal or a genuine issue within the current of the DC motor system 110.

In step 460, the method 400 may automatically notify a support system of the potential reliability issue. The support system may include a DC motor expert, and/or others familiar with the DC motor system. The expert may analyze the plurality of operating data 120 and the results from the DC condition forecaster 140 to confirm the reliability issue and the remaining time before failure of the components of the DC motor system 110. The support system may be a third-party service of which the operator of the DC motor system 110 subscribes. For example, but not limiting of, the support system may be provided by the original equipment manufacturer (OEM), or the like.

Figure 5:
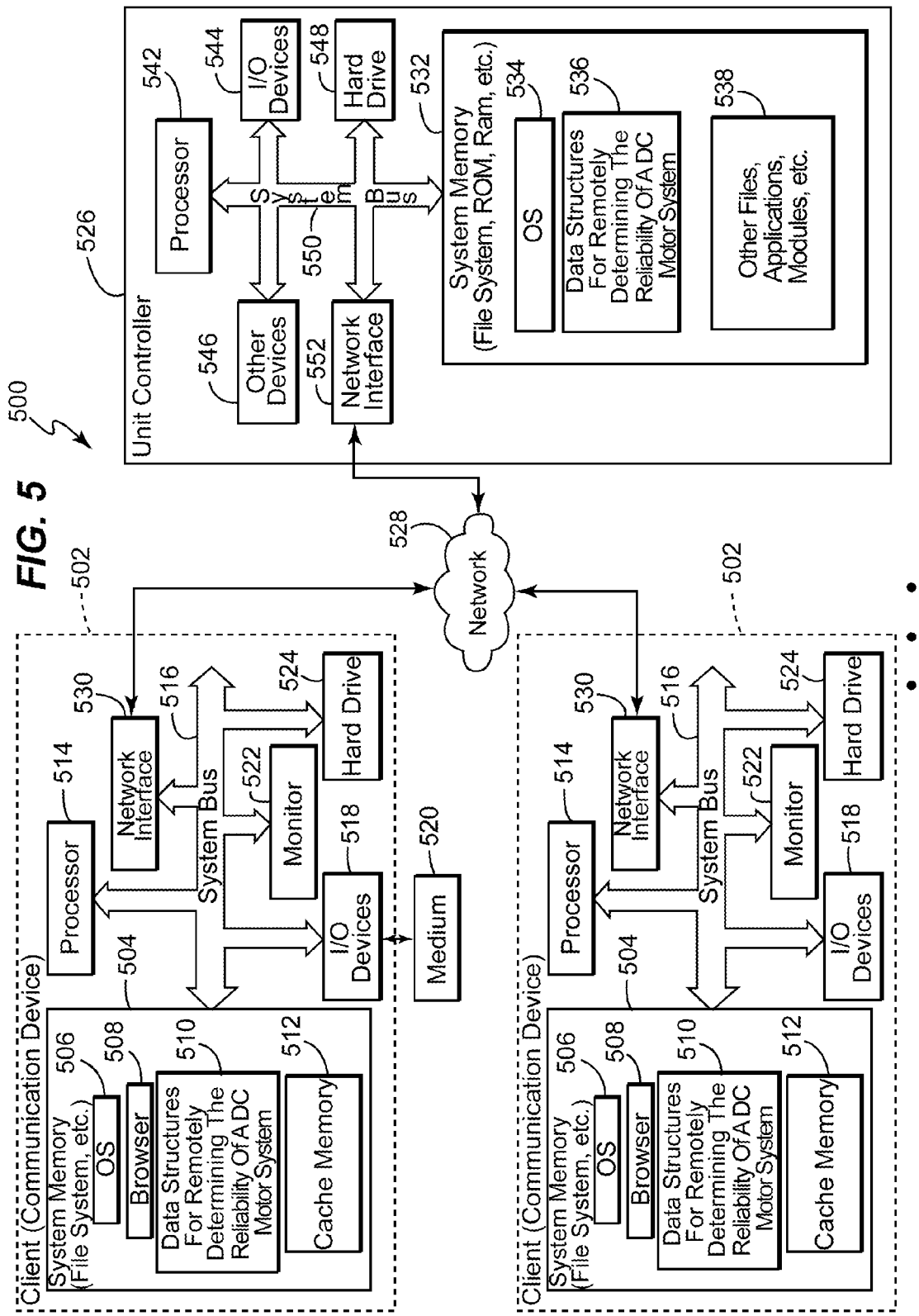
FIG. 5 is a block diagram of an exemplary system for determining the reliability of a DC motor system in accordance with an embodiment of the present invention.

FIG. 5 is a block diagram of an exemplary system 500 for remotely determining the reliability of a DC motor system 110 in accordance with an embodiment of the present invention. The elements of the method 300 may be embodied in and performed by the system 500. The system 500 may include one or more user or client communication devices 502 or similar systems or devices (two are illustrated in FIG. 5). Each communication device 502 may be for example, but not limited to, a computer system, a personal digital assistant, a cellular phone, or similar device capable of sending and receiving an electronic message.

The communication device 502 may include a system memory 504 or local file system. The system memory 504 may include for example, but is not limited to, a read only memory (ROM) and a random access memory (RAM). The ROM may include a basic input/output system (BIOS). The BIOS may contain basic routines that help to transfer information between elements or components of the communication device 502. The system memory 504 may contain an operating system 506 to control overall operation of the communication device 502. The system memory 504 may also include a browser 508 or web browser. The system memory 504 may also include data structures 510 or computer-executable code for determining the reliability of a DC motor system 110 that may be similar or include elements of the method 300 in FIG. 3.

The system memory 504 may further include a template cache memory 512, which may be used in conjunction with the method 300 in FIG. 3 for determining the reliability of a DC motor system 110.

The communication device 502 may also include a processor or processing unit 514 to control operations of the other components of the communication device 502. The operating system 506, browser 508, and data structures 510 may be operable on the processing unit 514. The processing unit 514 may be coupled to the memory system 504 and other components of the communication device 502 by a system bus 516.

The communication device 502 may also include multiple input devices (I/O), output devices or combination input/output devices 518. Each input/output device 518 may be coupled to the system bus 516 by an input/output interface (not shown in FIG. 5). The input and output devices or combination I/O devices 518 permit a user to operate and interface with the communication device 502 and to control operation of the browser 508 and data structures 510 to access, operate and control the software to predict the remaining life of a DC motor system 110. The T/O devices 518 may include a keyboard and computer pointing device or the like to perform the operations discussed herein.

The I/O devices 518 may also include for example, but are not limited to, disk drives, optical, mechanical, magnetic, or infrared input/output devices, modems or the like. The I/O devices 518 may be used to access a storage medium 520. The medium 520 may contain, store, communicate, or transport computer-readable or computer-executable instructions or other information for use by or in connection with a system, such as the communication devices 502.

The communication device 502 may also include or be connected to other devices, such as a display or monitor 522. The monitor 522 may permit the user to interface with the communication device 502.

The communication device 502 may also include a hard drive 524. The hard drive 524 may be coupled to the system bus 516 by a hard drive interface (not shown in FIG. 5). The hard drive 524 may also form part of the local file system or system memory 504. Programs, software, and data may be transferred and exchanged between the system memory 504 and the hard drive 524 for operation of the communication device 502.

The communication device 502 may communicate with a server 526 and may access other servers or other communication devices similar to communication device 502 via a network 528. The system bus 516 may be coupled to the network 528 by a network interface 530. The network interface 530 may be a modem, Ethernet card, router, gateway, or the like for coupling to the network 528. The coupling may be a wired or wireless connection. The network 528 may be the Internet, private network, an intranet, or the like.

The server 526 may also include a system memory 532 that may include a file system, ROM, RAM, and the like. The system memory 532 may include an operating system 534 similar to operating system 506 in communication devices 502. The system memory 532 may also include data structures 536 for determining the reliability of a DC motor system 110. The data structures 536 may include operations similar to those described with respect to the method 300 for predicting the remaining life of a DC motor system 110. The server system memory 532 may also include other files 538, applications, modules, and the like.

The server 526 may also include a processor 542 or a processing unit to control operation of other devices in the server 526. The server 526 may also include I/O device 544. The I/O devices 544 may be similar to I/O devices 518 of communication devices 502. The server 526 may further include other devices 546, such as a monitor or the like to provide an interface along with the I/O devices 544 to the server 526. The server 526 may also include a hard disk drive 548. A system bus 550 may connect the different components of the server 526. A network interface 552 may couple the server 526 to the network 528 via the system bus 550.

The flowcharts and step diagrams in the figures illustrate the architecture, functionality, and operation of possible implementations of systems, methods, and computer program products according to various embodiments of the present invention. In this regard, each step in the flowchart or step diagrams may represent a module, segment, or portion of code, which comprises one or more executable instructions for implementing the specified logical function(s). It should also be noted that, in some alternative implementations, the functions noted in the step may occur out of the order noted in the figures. For example, two steps shown in succession may, in fact, be executed substantially concurrently, or the steps may sometimes be executed in the reverse order, depending upon the functionality involved. It will also be noted that each step of the step diagrams and/or flowchart illustration, and combinations of steps in the step diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, it should be appreciated that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method of remotely determining reliability for at least one DC motor system located on a site, the method comprising:
    providing at least one remote monitoring and diagnostics (RM&D) system, wherein the at least one RM&D system is at a location different from the site having the at least one DC motor system;
    integrating the at least one RM&D system with at least one DC motor condition forecaster, wherein the at least one DC motor system condition forecaster receives a plurality of operating data from the at least one DC motor system;
    receiving the plurality of operating data from the at least one DC motor condition forecaster;
    transmitting a plurality of historical operating data corresponding to the at least one DC motor system from at least one historical database to the at least one RM&D system;
    utilizing the plurality of operating data to determine whether reliability of at least one component of the at least one DC motor system are within an alarm range; and
    if reliability of the of at least one component of the at least one DC motor system are within the alarm range; then notifying at least one support network.

2. The method of claim 1, wherein the step of integrating the at least one RM&D system with the DC motor system condition forecaster further comprises:
    the at least one DC motor system condition forecaster performing at least one failure analysis based on a composite of reliability probability distributions corresponding to predetermined sub-populations of historical failure causes relating to the at least one DC motor system;
    the at least one DC motor system condition forecaster developing at least one causal network for modeling reliability of a plurality of DC motor systems, including the at least one DC motor system and assessing the condition of the at least one component of the at least one DC motor system based on the at least one causal network; and
    the at least one DC motor system condition forecaster performing at least one integrated causal network and reliability analysis of the at least one DC motor system, wherein results from the at least one analysis are integrated with results from the step of assessing the condition of the at least one component of the at least one DC motor system on the at least one causal network to compute a quantitative value for a time remaining before the failure of the at least one component of the at least one DC motor system.

3. The method of claim 1 further comprising determining a remaining time before a failure of the at least one component of the at least one DC motor system.

4. The method of claim 1, wherein the step of developing the causal network comprises utilizing fuzzy logic.

5. The method of claim 1, wherein the step of performing at least one integrated causal network and reliability analysis of the at least one DC motor system comprises modeling a failure rate of a system component using a Weibull probability distribution function.

6. The method of claim 1 wherein data in the step of receiving operational indicator data comprises at least one of a commutator sensor; a spark detection sensor; or an arcing detection sensor; and combinations thereof.

7. The method of claim 1 wherein the operational indictor data comprises data representing: an armature current; a field current; a field temperature; a bearing temperature; or vibration; and combinations thereof.

8. The method of claim 1 wherein the at least one RM&D system comprises the RM&D system providing a graphical user interface that displays an estimated remaining time before failure of at least one of at least one component of the DC motor system.

9. The method of claim 1, further comprising integrating the at least one RM&D system with at least one remote DC motor system, wherein the at least one remote DC motor system is at a location different from the site having the at least one DC motor system.

10. A method of remotely determining reliability for at least one DC motor system located on a site, the method comprising:
provinding at least one remote monitoring and diagnostics (RM&D) system, wherein the at least one RM&D system is at a location different from the site having the at least one DC motor system;
integrating the at least one RM&D system with at least one DC motor condition forecaster, wherein the at least one DC motor system condition forecaster receives a plurality of operating data from the at least one DC motor system; wherein the at least one DC condition forecaster comprises the steps of:
performing at least one failure analysis based on a composite of reliability probability distributions corresponding to predetermined sub-populations of historical failure causes relating to the at least one DC motor system;
developing at least one causal network for modeling reliability of a plurality of DC motor systems, including the at least one DC motor system and assessing the condition of the at least one component of the at least one DC motor system based on the at least one causal network, wherein the casual network utilizes fuzzy logic; and
performing at least one integrated causal network and reliability analysis of the at least one DC motor system utilizing a Weibull probability distribution function; wherein results from the at least one analysis are integrated with results from the step of assessing the condition of the at least one component of the at least one DC motor system on the at least one causal network to compute a quantitative value for a time remaining before the failure of the at least one component of the at least one DC motor system;
receiving the plurality of operating data from the at least one DC motor condition forecaster;
transmitting a plurality of historical operating data corresponding to the at least one DC motor system from at least one historical database to the at least one RM&D system;
utilizing the plurality of operating data to determine whether reliability of at least one component of the at least one DC motor system are within an alarm range; and
if reliability of the of at least one component of the at least one DC motor system are within the alarm range; then notifying at least one support network.

11. The method of claim 10 wherein data in the step of receiving operational indicator data comprises at least one of a commutator sensor; a spark detection sensor; or an arcing detection sensor; and combinations thereof; and wherein the operational indictor data comprises data representing: an armature current; a field current; a field temperature; a bearing temperature; or vibration; and combinations thereof.

12. The method of claim 10 wherein the at least one RM&D system comprises the RM&D system providing a graphical user interface that displays an estimated remaining time before failure of at least one component of the at least one DC motor system component.

13. The method of claim 10, further comprising integrating the at least one RM&D system with at least one remote DC motor system, wherein the at least one remote DC motor system is at a location different from the site having the at least one DC motor system.

14. A system for remotely determining reliability for at least one DC motor system located on a site, the system comprising:
at least one remote monitoring and diagnostics (RM&D) system, wherein the at least one RM&D system is located at a site different from the site having the at least one DC motor system; wherein the at least one RM&D system monitors a plurality of operating data of the at least one DC motor system;
at least one DC motor condition forecaster, wherein the at least one DC motor condition forecaster:
performs at least one failure analysis based on a composite of reliability probability distributions corresponding to predetermined sub-populations of historical failure causes relating to the at least one DC motor system;
develops at least one causal network for modeling reliability of a plurality of DC motor systems, including the at least one DC motor system and assessing the condition of the at least one component of the at least one DC motor system based on the at least one causal network, wherein the casual network utilizes fuzzy logic; and
performs at least one integrated causal network and reliability analysis of the at least one DC motor system utilizing a Weibull probability distribution function; wherein results from the at least one analysis are integrated with results from the step of assessing the condition of the at least one component of the at least one DC motor system on the at least one causal network to compute a quantitative value for a time remaining before the failure of the at least one component of the at least one DC motor system;
means for integrating the at least one RM&D system with the at least one DC motor condition forecaster;
means for transmitting the plurality of operating data from the DC motor condition forecaster to the at least one RM&D system;
means for receiving a plurality of historical operating data corresponding to the at least one DC motor system from at least one historical database;
means for utilizing the plurality of operating data to determine whether reliability and a remaining time before a failure of the at least one component of the at least one DC motor system are within an alarm range; and
means for determining if reliability and the remaining time before failure of at least one component of the at least one DC motor system are within the alarm range; and for notifying at least one support network.

15. The system of claim 14 wherein the operational indictor data comprises at least one of a commutator sensor; a spark detection sensor; or an arcing detection sensor; and combinations thereof.

16. The system of claim 14 wherein the at least one RM&D system comprises the RM&D system providing a graphical user interface that displays an estimated remaining time before failure of at least one component of the at least one DC motor system component.

17. The system of claim 14, further comprising integrating the at least one RM&D system with at least one remote DC motor system, wherein the at least one remote DC motor system is at a location different from the site having the at least one DC motor system.

18. The system of claim 14 further comprising means for transferring the operational indictor data to the historical database.

19. The system of claim 14, wherein the operational indictor data comprises data representing: an armature current; a field current; a field temperature; a bearing temperature; or vibration; and combinations thereof.

20. The system of claim 14, wherein the historical motor data comprises data representing an armature current; a field current; a field temperature; a bearing temperature; or vibration; and combinations thereof.

* * * * *